(12) United States Patent
Teufel

(10) Patent No.: US 6,533,356 B2
(45) Date of Patent: Mar. 18, 2003

(54) GEAR MECHANISM FOR A VEHICLE SEAT ADJUSTER

(75) Inventor: Ingo Teufel, Rockenhausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 09/832,569

(22) Filed: Apr. 11, 2001

(65) Prior Publication Data

US 2001/0050505 A1 Dec. 13, 2001

(30) Foreign Application Priority Data

Apr. 12, 2000 (DE) .......................... 100 18 108

(51) Int. Cl.$^7$ ................................ B60N 2/02
(52) U.S. Cl. ........................ 297/362; 74/475
(58) Field of Search .............. 297/362; 74/475

(56) References Cited

U.S. PATENT DOCUMENTS

| | | | | |
|---|---|---|---|---|
| 4,025,109 A | * | 5/1977 | Klingelhofer et al. | 297/362 |
| 4,227,741 A | * | 10/1980 | Gross et al. | 297/362 |
| 4,407,544 A | * | 10/1983 | Bahring | 297/362 |
| 4,708,392 A | * | 11/1987 | Werner et al. | 297/362 |
| 4,832,405 A | | 5/1989 | Werner et al. | |
| 4,874,204 A | * | 10/1989 | Walk | 297/362 |
| 4,943,116 A | * | 7/1990 | Ohwada et al. | 297/362 |
| 5,030,184 A | * | 7/1991 | Rennerfelt | 475/162 |
| 5,524,970 A | * | 6/1996 | Kienke et al. | 297/362 |
| 6,076,889 A | * | 6/2000 | Su et al. | 297/362 |

FOREIGN PATENT DOCUMENTS

| | | |
|---|---|---|
| DE | 37 05 116 A1 | 9/1988 |
| DE | 195 27 374 C2 | 1/1997 |
| DE | 198 29 372 A1 | 1/2000 |

OTHER PUBLICATIONS

*McGraw-Hill Encyclopedia of Science & Technology*, 7th Edition, 1992, pp. 609–610.
Johannes Looman, "Zahnradgetriebe", Springer 1996, 3. Auflage, S.49, p.1, 1.5, and p.5, 1.5.

* cited by examiner

*Primary Examiner*—Peter M. Cuomo
*Assistant Examiner*—Joseph Edell
(74) *Attorney, Agent, or Firm*—Alston & Bird LLP

(57) ABSTRACT

A gear mechanism (1) for a vehicle seat adjuster with at least two hollow wheels (11,28) having internal gears, which are mounted side by side and adapted for rotating relative to each other, with at least one rotating planet gear (24) axially arranged between the hollow wheels (11,28), and bearing sleeves (22,26) acting in radially different directions, which eliminates a radial backlash in the locked state of the gear mechanism (1).

10 Claims, 4 Drawing Sheets

GEAR MECHANISM FOR A VEHICLE SEAT ADJUSTER

BACKGROUND OF THE INVENTION

The present invention relates to a gear mechanism for a vehicle seat adjuster.

An open planetary gear train (D gearing) may be used as a drive for an adjuster of a vehicle seat, wherein an inactive gearing acts as a locking device. Manufacturing-related tolerances of the components may lead to a backlash at the driven end. In the case of a locked gearing, this backlash may cause noises and undesired movements in the driving operation. On the other hand, the actuation of the gearing requires a minimum backlash of teeth, for obtaining a uniform adjustment. In a gear mechanism disclosed in DE 195 27 374 C2, which is designed and constructed as a simple reversing gear mechanism with an upper member as a center gear and a lower member as a planet gear, a wedge sliding device is proposed. An axial displacement of a slide permits eliminating a radial backlash between the two members of the mechanism. However, this solution cannot be transferred to a gear mechanism of the initially described kind, which is used for cases without a wobbling motion, since the increased number of components between a plurality of components does not permit eliminating the backlash at the same time.

SUMMARY OF THE INVENTION

It is therefore an object of the present invention to improve a gear mechanism of the initially described kind.

The above and other objects and advantages of the present invention are achieved by the provision of a gear mechanism which comprises at least two hollow wheels having internal gears and being mounted in a side by side arrangement for relative rotation, at least one rotatable planet gear positioned to selectively engage the internal gears of the two hollow wheels, and means acting in radially different directions for eliminating play between the internal gears of the two hollow wheels. Preferably the means for eliminating play operates in radially opposite directions on the planet gear and one of the hollow wheels, respectively.

As a result of providing means acting in radially different directions, which eliminate a radial backlash in the locked state of the gear mechanism, it is possible to realize a zero backlash likewise in a gear mechanism with more than two components that are adapted for rotation relative to one another. For example, in the case of three components that are capable of rotating relative to one another, it is possible to eliminate with these means, which operate preferably in radially opposite directions, the radial backlash between the planet gear and respectively one of the two hollow wheels at the same time. Preferably, the radially different action is achieved by an axial movement of the means, for example, by means of a tie rod. Such a simplified construction makes it possible to better act upon means provided in the interior of the gear mechanism, without adversely affecting their pivoting function.

The means may be designed and constructed as a rotary slide joint, for example, an axially displaceable bearing for the gears for purposes of being operative both in the radial and in the axial direction. Preferably, the means are provided with a wedge sliding device, which converts in the case of an activation, an axial force into a radial force and an axial displacement into a radial displacement. In a preferred construction of the means in the form of bearing sleeves, the outer wall surfaces form the rotary joint, whereas an inner guide track for a wedge forms the wedge sliding device.

To apply the force for eliminating the backlash, it is preferred to provide an energy storage, for example a spring, for purposes of moving the means. To activate or deactivate the backlash elimination selectively between a locked and an operative state of the gear mechanism, the energy storage is preferably adapted for disengagement. To this end, the drive is provided with radial cams for disengaging the energy storage.

The gear mechanism of the present invention is used preferably in a vehicle seat, in particular in an automobile seat, for example, in an inclination adjuster for the entire seat surface (bucket) or for a portion of the seat surface, for the seatback and/or the head rest, or in a height adjuster, in particular in locations, where forces occur.

BRIEF DESCRIPTION OF THE DRAWINGS

In the following, the invention is described in greater detail with reference to an embodiment illustrated in the drawing, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
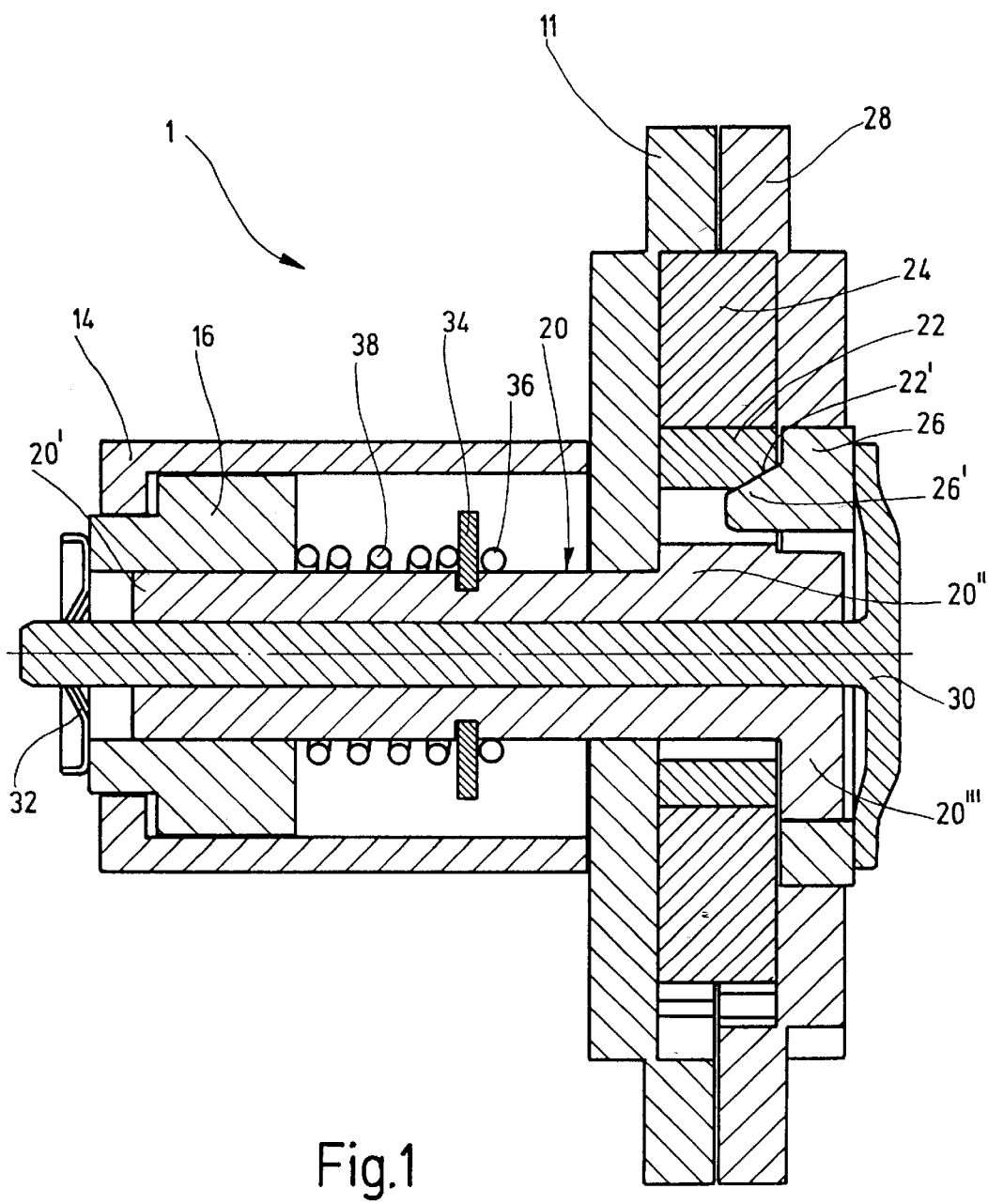
FIG. 1 is an axially sectioned view of the embodiment in a locked state along line I—I of FIG. 2.
Figure 2:
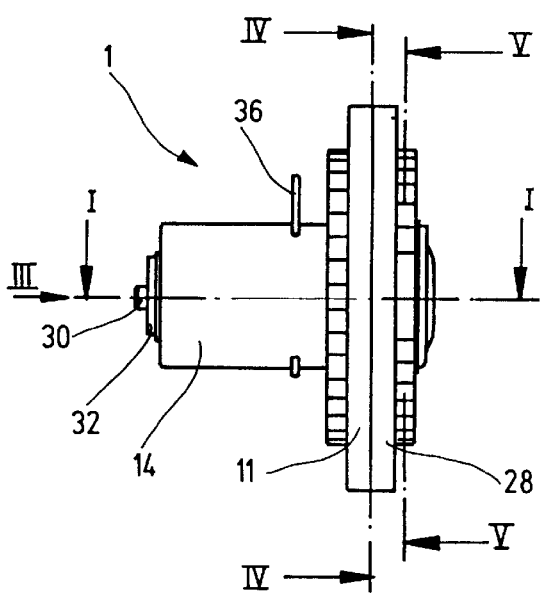
FIG. 2 is a side view of the embodiment.
Figure 3:
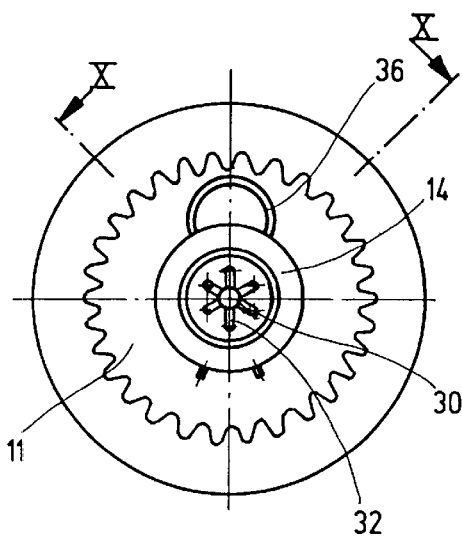
FIG. 3 is a front view of the embodiment in the direction of arrow III of FIG. 2.
Figure 4:
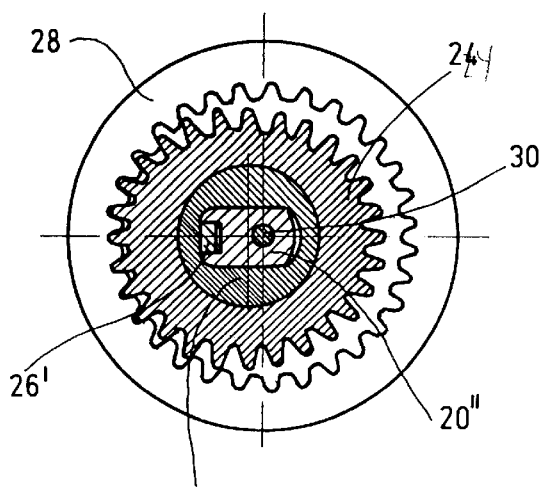
FIG. 4 is a cross sectional view of the embodiment along line IV—IV of FIG. 2.
Figure 5:
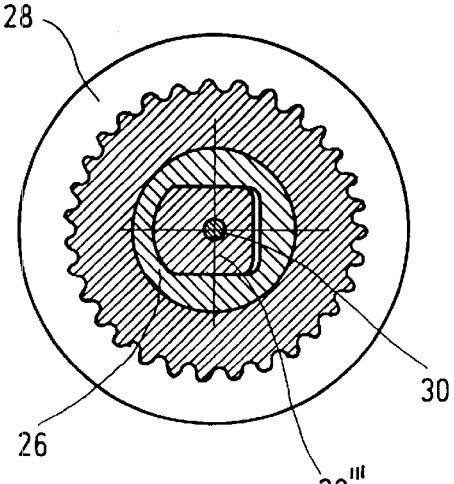
FIG. 5 is a cross sectional view along line V—V of FIG. 2.
Figure 6:
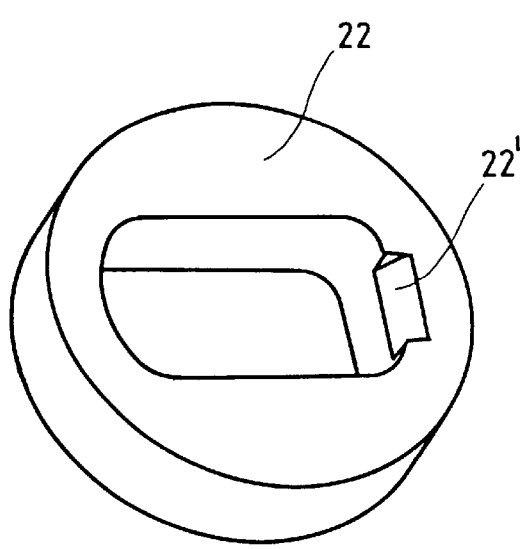
FIG. 6 is a perspective view of a pinion bearing sleeve.
Figure 7:
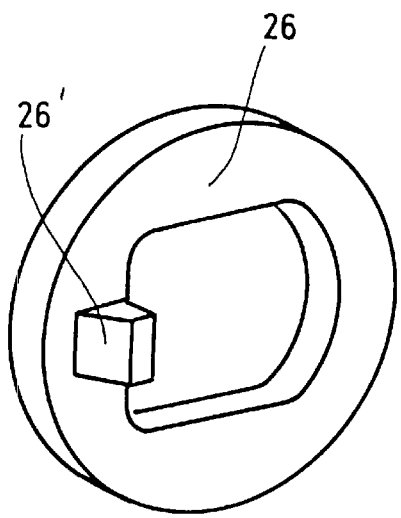
FIG. 7 is a perspective view of a hollow wheel bearing sleeve.
Figure 8:
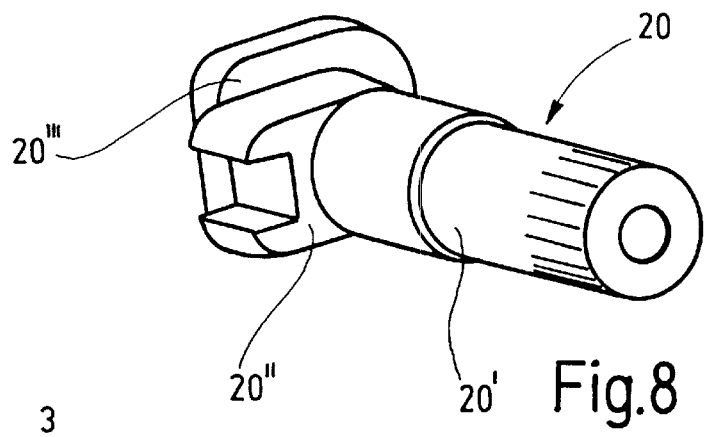
FIG. 8 is a perspective view of an eccentric.
Figure 9:
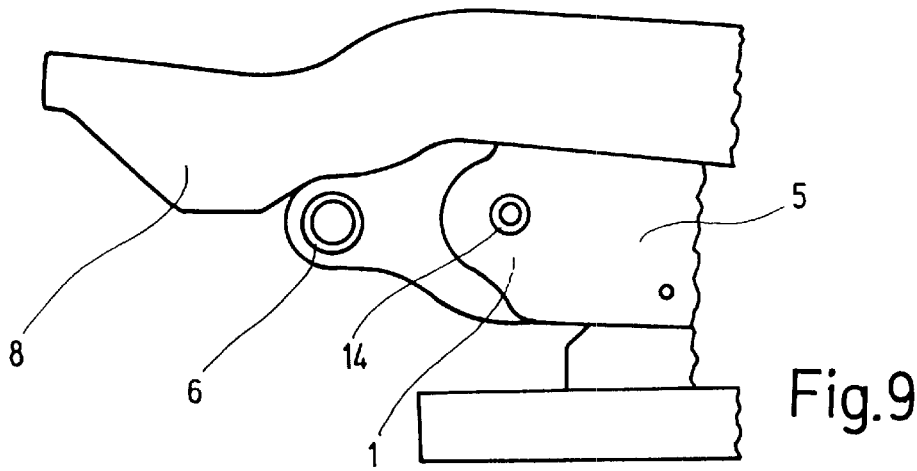
FIG. 9 is an only partial, schematic side view of a vehicle seat with the embodiment.
Figure 10:
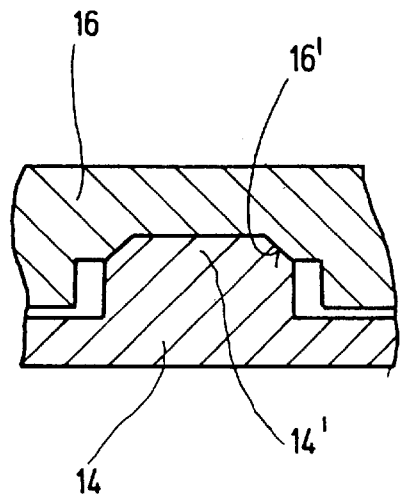
FIG. 10 is an only partial, sectional view along line X—X of FIG. 3.
Figure 11:
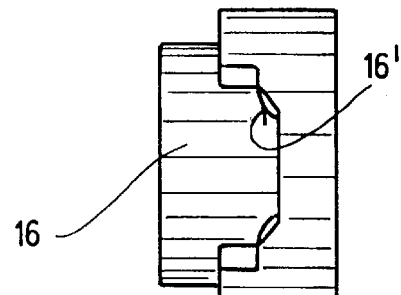
FIG. 11 is a side view of a release sleeve.
Figure 12:
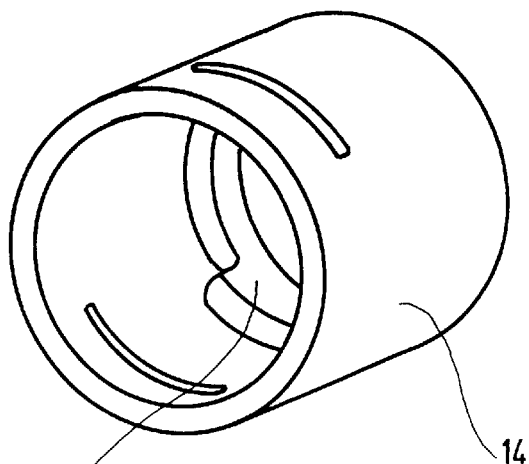
FIG. 12 is a perspective view of a drive sleeve.

In the illustrated embodiment, a gear mechanism 1, which is designed and constructed as a simple reversing planetary gear train, is provided in a vehicle seat 3 (FIG. 9) for an inclination adjuster of the seat surface. When being installed in a seat support of vehicle seat 3, the gear mechanism 1 is arranged on one of the two sides of vehicle seat 3 at the front end of a seat frame 5, with a pivot axle extending in the horizontal direction. At the driven end, the gear mechanism 1 mounts via a rocker arm in the form of a side plate, a horizontal bar 6, which extends to a joint on the other side of vehicle seat 3, and supports the front edge of a seat bucket 8. By actuating the gear mechanism 1, same pivots such that the inclination of seat bucket 8 can be adjusted relative to vehicle seat 3. When inactive, the gearing mechanism 1 locks, so that the adjusted inclination is maintained.

For mounting to seat frame 5, the gear mechanism 1, which is designed and constructed as a D6 gearing, includes a first, stationary hollow wheel 11, whose internal toothing acting as a center gear is directed in the axial direction toward the inner side of vehicle seat 3, when the gear mechanism 1 is installed. In the axial direction on the outer side of stationary hollow wheel 11, a first control sleeve 14 on the drive side, hereafter drive sleeve 14, with a cylindrical basic shape, is arranged with its one end face in concentric relationship with the internal toothing of stationary hollow wheel 11 for a relative rotation therewith. A hand wheel (not shown) may be arranged for corotation on drive sleeve 14. A second, shorter control sleeve of a likewise cylindrical basic shape, hereafter release sleeve 16, is arranged for rotation inside drive sleeve 14. With its outer side, the release sleeve 16 lies against the inner side of drive sleeve 14. On its axially outer end, the drive sleeve 14 includes a radial cam, which is formed by a radially inward projecting cam portion 14' of a suitable shape in the axial direction. At its corresponding end on its outer side, the release sleeve 16 includes likewise a radial cam with a stop surface, which is formed by a radially inward recessed cam portion 16' of a suitable shape in the axial direction.

Inside release sleeve 16, a shaft 20' extends, which is associated to an eccentric 20. By means of a serration between release sleeve 16 and shaft 20', the release sleeve 16 is adapted for corotation in the circumferential direction and for movement relative to shaft 20' in the axial direction. The shaft 20' arranged in concentric relationship with the internal toothing of stationary hollow wheel 11 extends in the axial direction through a center bore in stationary hollow wheel 11. In its end section facing away from the serration, the eccentric 20 includes on shaft 20', an eccentric portion 20" made integral therewith, and adjacent thereto in the axial direction, a bearing portion 20''' made likewise integral therewith. The slightly rectangularly shaped eccentric portion 20" mounts in eccentric relationship with shaft 20' a pinion bearing sleeve 22, which connects to eccentric 20 for rotation therewith. The bearing sleeve 22 rotatably mounts as a planet gear a pinion 24, which is arranged parallel to stationary hollow wheel 11 in a cavity defined by its internal toothing. The pinion 24 engages this internal toothing, and is able to rotate along same. The axial dimension of pinion 24 is about twice that of the internal toothing of stationary hollow wheel 11.

Supported on bearing portion 20''' for rotation therewith and in concentric relationship with shaft 20' is a hollow wheel bearing sleeve 26. Arranged for rotation about the hollow wheel bearing sleeve 26 is a second, driven hollow wheel 28, which is largely similar to stationary hollow wheel 11 as regards dimensions, and in alignment with same. However, the internal toothing of hollow wheel 28 at the driven end, which faces pinion 24, has a different number of teeth than that of stationary hollow wheel 11. The hollow wheel bearing sleeve 26, which is provided with a receptacle for bearing portion 20''' includes in a location adjacent this receptacle, a wedge 26', which is designed and constructed as a narrowing, prismatic material portion projecting in the axial direction from that end face, which faces pinion bearing sleeve 22. The oblique surface, which causes the taper, faces pinion bearing sleeve 22. The pinion bearing sleeve 22 has in its receptacle for eccentric portion 20" a recessed slope 22', which faces wedge 26' and is capable of cooperating with same. The slope 22' adjoins the radially outermost point of eccentric portion 20", which includes a cutout for wedge 26'.

A tie rod 30 with a cylindrical shank and a flange at one end extends from the driven end through a center bore of shaft 20' of the eccentric 20, so that the flange of tie bar 30 lies against hollow bearing sleeve 26. With its other end, the tie rod 30 extends somewhat beyond shaft 20'. A snap fastener 32 is applied to this end of tie rod 30, and lies against release sleeve 16, which extends in this region outward through an opening in an end wall of drive sleeve 14.

In a region between the serration for release sleeve 16 and the opening through stationary hollow wheel 11, the shaft 20' of eccentric 20 mounts a disk 34. For this purpose, the disk 34 with an annular outer contour is cut out in U-shape and inserted with its two legs in two slots of shaft 20'. On the side of disk 34, which faces stationary hollow wheel 11, a U-shaped clamp 36 is arranged, which extends with two legs from the outer side of drive sleeve 14 through two radial bores in same, lies against shaft 20', and extends again through two further radial bores in drive sleeve 14 to the outer side thereof. The clamp 36 secures drive sleeve 14 in the axial direction. On the side of disk 34 facing release sleeve 16, a biased compression spring 38 extends between disk 34 and release sleeve 16.

The gear mechanism 1 is designed and constructed such that the hollow wheel 28 at the driven end is rotatable relative to stationary hollow wheel 11 by means of drive sleeve 14 for purposes of actuating in the embodiment the inclination adjuster of vehicle seat 3. To this end, the drive sleeve 14 is rotated about its axis, for example, manually via the aforesaid hand wheel. In so doing, the release sleeve 16 is pushed by means of the radial cams over a limited angle of rotation to some extent axially inward against the force of compression spring 38, and otherwise it is entrained in the circumferential direction. As a result, the tie rod 30 having been engaged until now is caused to ease, and the compression spring 38 to disengage. The release sleeve 16 rotates eccentric 20, which rotates the pinion 24 via pinion bearing sleeve 22. The pinion 24 rotates in stationary hollow wheel 11. The hollow wheel 28 at the driven end, which is supported for rotation on hollow wheel bearing sleeve 26, engages pinion 24 in one location of its internal toothing, and consequently rotates because of the rotating pinion 24. In this connection, an adequate backlash of teeth is provided. The wall surfaces of the two bearing sleeves 22 and 26 act as a rotary joint. For an operation, which is the way a user sees it, the number of teeth in gear mechanism 1 is selected such that the aforesaid, driving hand wheel and the driven hollow wheel 28 have the same direction of rotation during their movement.

For a transition to the locked state of gear mechanism 1, the torque is entrained by drive sleeve 14. The compression spring 38 acting as an energy storage for equalizing the backlash pushes the release sleeve 16 axially outward toward the end wall of drive sleeve 14. Via snap fastener 32, the release sleeve 16 pulls tie rod 30, which is then again engaged. By means of the flange at its other end, the tie rod 30 pushes upon hollow wheel bearing sleeve 26. The pressure acting upon hollow wheel bearing sleeve 26 is converted by the geometry of wedge 26' and slope 22' in part into a pressure, which acts in the radial direction upon the pinion bearing sleeve 22. The two bearing sleeves 22 and 26 having between their end faces a small play, act as a wedge sliding device for generating a zero backlash in the radial direction.

The pinion bearing sleeve 22 pushes radially outward (in the direction of the eccentricity of eccentric 20) upon pinion 24, which meshes in this direction already with the internal toothing of stationary hollow wheel 11. To the extent that there is a backlash between the teeth of pinion 24 and the internal teeth of stationary hollow wheel 11, same is eliminated by a small radial displacement of pinion bearing sleeve 22 and pinion 24. Conversely, the pressure of wedge 26' upon slope 22' of pinion bearing sleeve 22 leads to a force of reaction, which causes the hollow wheel bearing sleeve 26 to displace in the radial direction against pinion 24. Since at the radially opposite end the hollow wheel bearing sleeve 26 entrains driven hollow wheel 28, same moves with its internal toothing toward pinion 24, so that the backlash is likewise removed between these two components.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A gear mechanism which is adapted to permit adjustment of the inclination of a vehicle seat, comprising:
    at least two hollow wheels having internal gears and being mounted in a side by side arrangement for relative rotation about an axis extending in an axial direction,
    at least one rotatable planet gear positioned to selectively engage the internal gears of the two hollow wheels, and
    a play-eliminating mechanism acting in radially different directions on the planet gear and a first wheel of the two hollow wheels, respectively, for eliminating play between the internal gears of the two hollow wheels, with the play-eliminating mechanism including:
        a rotatable eccentric shaft,
        a first hollow bearing sleeve mounted on the eccentric shaft and which mounts the planet gear for rotation about the circumference of the first bearing sleeve,
        a second hollow bearing sleeve mounted on the eccentric shaft and which rotatably mounts the first wheel about the circumference of the second bearing sleeve,
        a wedge provided on the second bearing sleeve, with the wedge being prismatically shaped and projecting in the axial direction from the second bearing sleeve, and an inclined surface of the wedge facing partially in the axial direction and partially radially outward, and
        an energy storage for biasing the inclined surface of the wedge onto a mating surface on the first bearing sleeve so as to bias the first bearing sleeve and thus the planet gear radially outwardly.

2. The gear mechanism as defined in claim 1, further comprising a mechanism for selectively disengaging the energy storage.

3. The gear mechanism as defined in claim 2, wherein the energy storage includes a tie rod extending coaxially through the eccentric shaft, said tie rod having a flange positioned at one end thereof to engage the outer side of the second bearing sleeve, a spring coaxially disposed about the eccentric shaft, and a release sleeve positioned coaxially about the eccentric shaft so that the spring acts through the release sleeve to bias the tie rod axially against the second bearing sleeve.

4. The gear mechanism as defined in claim 3, wherein the mechanism for selectively disengaging the energy storage includes a drive sleeve coaxially disposed about the release sleeve, and a cam apparatus formed between the drive sleeve and the release sleeve for axially advancing and rotating the release sleeve to separate the release sleeve from the tie rod upon rotation of the drive sleeve.

5. The gear mechanism as defined in claim 4, further comprising a serration formed between the release sleeve and the eccentric shaft such that the eccentric shaft rotates upon rotation of the release sleeve.

6. The gear mechanism of claim 1, in combination with:
    a seat frame which mounts a seat, wherein the gear mechanism is mounted on the seat frame for permitting the inclination of the seat to be adjusted.

7. A gear mechanism which is adapted to permit adjustment of the inclination of a vehicle seat, comprising:
    at least two hollow wheels having internal gears and being mounted in a side by side arrangement for relative rotation about an axis extending an axial direction,
    at least one rotatable planet gear positioned to selectively engage the internal gears of the two hollow wheels,
    a play-eliminating mechanism acting in radially different directions on the planet gear and a first wheel of the two hollow wheels, respectively, for eliminating play between the internal gears of the two hollow wheels, with the play-eliminating mechanism including:
        a rotatable eccentric shaft,
        a first hollow bearing sleeve mounted on the eccentric shaft and which mounts the planet gear for rotation about the circumference of the first bearing sleeve,
        a second hollow bearing sleeve mounted on the eccentric shaft and which rotatably mounts the first wheel about the circumference of the second bearing sleeve,
        a wedge on the second bearing sleeve,
        an energy storage for biasing the wedge onto a mating surface on the first bearing sleeve so as to bias the first bearing sleeve and thus the planet gear radially outwardly, wherein the energy storage includes a tie rod extending coaxially through the eccentric shaft, said tie rod having a flange positioned at one end thereof to engage the outer side of the second bearing sleeve, a spring coaxially disposed about the eccentric shaft, and a release sleeve positioned coaxially about the eccentric shaft so that the spring acts through the release sleeve to bias the tie rod axially against the second bearing sleeve; and
        a disengaging mechanism for selectively disengaging the energy storage.

8. The gear mechanism as defined in claim 7, wherein the disengaging mechanism includes a drive sleeve coaxially disposed about the release sleeve, and a cam apparatus formed between the drive sleeve and the release sleeve for axially advancing and rotating the release sleeve to separate the release sleeve from the tie rod upon rotation of the drive sleeve.

9. The gear mechanism as defined in claim 8, further comprising a serration formed between the release sleeve and the eccentric shaft such that the eccentric shaft rotates upon rotation of the release sleeve.

10. The gear mechanism of claim 7, in combination with:
    a seat frame which mounts a seat, wherein the gear mechanism is mounted on the seat frame for permitting the inclination of the seat to be adjusted.

* * * * *